US012288227B2

(12) United States Patent
Malloy et al.

(10) Patent No.: US 12,288,227 B2
(45) Date of Patent: Apr. 29, 2025

(54) SYSTEMS AND METHODS FOR GENERATING AND TRANSMITTING CONTENT BASED ON ASSOCIATION OF A COMMON DEVICE

(71) Applicant: comScore, Inc., Reston, VA (US)

(72) Inventors: Matthew L. Malloy, Madison, WI (US); Paul Barford, Madison, WI (US); Ceyhun Alp, Lausanne (CH)

(73) Assignee: Comscore, Inc., Reston, VA (US)

(*) Notice: Subject to any disclaimer, the term of this patent is extended or adjusted under 35 U.S.C. 154(b) by 433 days.

(21) Appl. No.: 15/726,777

(22) Filed: Oct. 6, 2017

(65) Prior Publication Data

US 2019/0108554 A1    Apr. 11, 2019

(51) Int. Cl.
| G06Q 30/02 | (2023.01) |
| G06F 7/14 | (2006.01) |
| G06N 20/00 | (2019.01) |
| G06Q 30/0251 | (2023.01) |

(52) U.S. Cl.
CPC ........... *G06Q 30/0271* (2013.01); *G06F 7/14* (2013.01); *G06N 20/00* (2019.01)

(58) Field of Classification Search
None
See application file for complete search history.

(56) References Cited

U.S. PATENT DOCUMENTS

| 5,613,014 | A | * | 3/1997 | Eshera | ............... | G06V 40/1371 |
| | | | | | | 382/125 |
| 6,122,639 | A | * | 9/2000 | Babu | ...................... | H04L 12/12 |
| 7,493,388 | B2 | * | 2/2009 | Wen | ..................... | G06Q 10/087 |
| | | | | | | 705/28 |
| 9,077,949 | B2 | * | 7/2015 | Haseyama | ......... | H04N 21/4394 |
| 9,165,124 | B1 | * | 10/2015 | Gurevich | ................ | G06F 21/44 |
| 10,244,363 | B1 | * | 3/2019 | Niranjayan | ............. | H04W 4/33 |
| 2015/0163218 | A1 | * | 6/2015 | Mohan | .................... | G06F 21/45 |
| | | | | | | 726/6 |
| 2017/0024484 | A1 | * | 1/2017 | Qiu | ..................... | G06Q 30/0269 |
| 2017/0193394 | A1 | * | 7/2017 | Fang | ....................... | G06N 20/00 |
| 2017/0351530 | A1 | * | 12/2017 | Gupta | ................. | G06F 9/30087 |

(Continued)

OTHER PUBLICATIONS

Zhi-Hua Zhou; Tri-training: exploiting unlabeled data using three classifiers; IEEE;2005; pp. 1529-1541.*

*Primary Examiner* — Ann J Lo
*Assistant Examiner* — Jermaine A Mincey
(74) *Attorney, Agent, or Firm* — Blank Rome LLP

(57) ABSTRACT

A computerized method of generating a report is disclosed, along with a corresponding system and non-transitory computer-readable medium. The method may include receiving training data including labeled feature sets and an indicator of a common device. The method may include receiving a first identifier with a first feature set, and a second identifier with a second feature set. The method may include correlating the first and second feature sets, and generating a common device score based on the correlated first and second feature sets and the training data. The method may also include comparing the common device score to a threshold, and associating, in response to the comparison, the first identifier and the second identifier with a device. The method may further include generating the report that indicates that the first and second identifiers are associated with the device.

19 Claims, 3 Drawing Sheets

(56) References Cited

U.S. PATENT DOCUMENTS

2017/0366602 A1* 12/2017 Kawazoe ................ H04L 67/10
2018/0181868 A1*  6/2018 Chew ....................... G06N 5/02
2018/0203893 A1*  7/2018 Cmielowski ........ G06F 16/2365

* cited by examiner

SYSTEMS AND METHODS FOR GENERATING AND TRANSMITTING CONTENT BASED ON ASSOCIATION OF A COMMON DEVICE

TECHNICAL FIELD

The present disclosure relates generally to systems and methods for generating and transmitting content, and more particularly, to systems and methods for generating and transmitting content based on detection of multiple identifiers associated with a common device.

BACKGROUND

Devices (e.g., PCs, smartphones, and tablets) are assigned multiple identifiers by servers as they access resources through the Internet. Over the course of a day, a single device may be assigned multiple different web browser cookies from multiple browsers. For example, a smartphone can be assigned a first cookie when accessing resources through a default browser (e.g., Safari), a second cookie from an app (e.g., Facebook), and a third cookie from another browser embedded in the app. Additional identifiers may be assigned to the device through OS-level advertising content (e.g., Apple's Identifier For Advertisers (IDFA) and Android's Advertising ID). The identifiers can be reset and further multiply, such as during software updates.

One common use of the identifiers is in online advertising applications that seek to deliver customized content to users. Another important application is in media consumption tracking. Both processes attempt to identify the user and track websites accessed through the device. However, the current perspective of the user is limited due to the disconnect between the various identifiers generated for that device. It would be favorable to provide an enriched perspective of the device by creating a more comprehensive perspective of multiple identifiers.

SUMMARY

The foregoing needs are met, to a great extent, by the systems and methods described herein. In one aspect, a computerized method of generating a report includes receiving training data including labeled feature sets and an indicator of a common device. The method may include receiving a first identifier with a first feature set, and a second identifier with a second feature set. The method may include correlating the first and second feature sets, and generating a common device score based on the correlated first and second feature sets and the training data. The method may also include comparing the common device score to a threshold, and associating, in response to the comparison, the first identifier and the second identifier with a device. The method may further include generating the report that indicates that the first and second identifiers are associated with the device. Another aspect is directed to a system including at least one processor, and at least one memory storing instructions that, when executed, cause the at least one processor to perform the method described above. Yet another aspect is directed to a non-transitory computer-readable medium storing instructions which, when executed, cause one or more processors to perform the method described above.

BRIEF DESCRIPTION OF THE DRAWINGS

In order that the disclosure may be more readily understood, aspects of this disclosure are illustrated by way of examples in the accompanying drawings.

The same reference numbers used in the drawings and the following detailed description refer to the same or similar parts.

DETAILED DESCRIPTION

Systems and methods for generating and transmitting content to a device based on association with multiple device identifiers are described herein. There is currently disconnect between the various device identifiers assigned to a single device. Associating multiple device identifiers with a single device enables a more consistent and enriched view of Internet usage. Overall, tag data, panel data, and/or census data may be used to generate labeled training data including indicators of whether feature sets are associated with a common device. A panel database may be generated including pairs of identified identifiers (e.g., cookies and/or IDFAs) and an indicator (e.g., label) that the pair of identifiers belong to the same device or not. The systems and methods may then collect features from tag data and/or census data corresponding to the identified identifiers of the panel database. The labeled training data may be generated to include the feature sets of the identified identifiers and the indicators of whether the feature sets belong to the same device or not. The systems and methods may then apply a test (e.g., a Bayesian similarity algorithm) to unlabeled pairs of feature sets based on the labeled training data to generate a common device score between the identifiers. A high score (e.g., greater than a threshold) of a pair of feature sets may indicate that two identifiers are associated with a common device. A report is generated and may be sent to a content provider that transmits comprehensive content to the device based on the associated device identifiers. The device identifiers may be clustered into small groups that correspond to individual devices using community detection algorithms, such as a modified Louvain Modularity community detection algorithm. Details of the above process are described in detail below.

Figure 1:
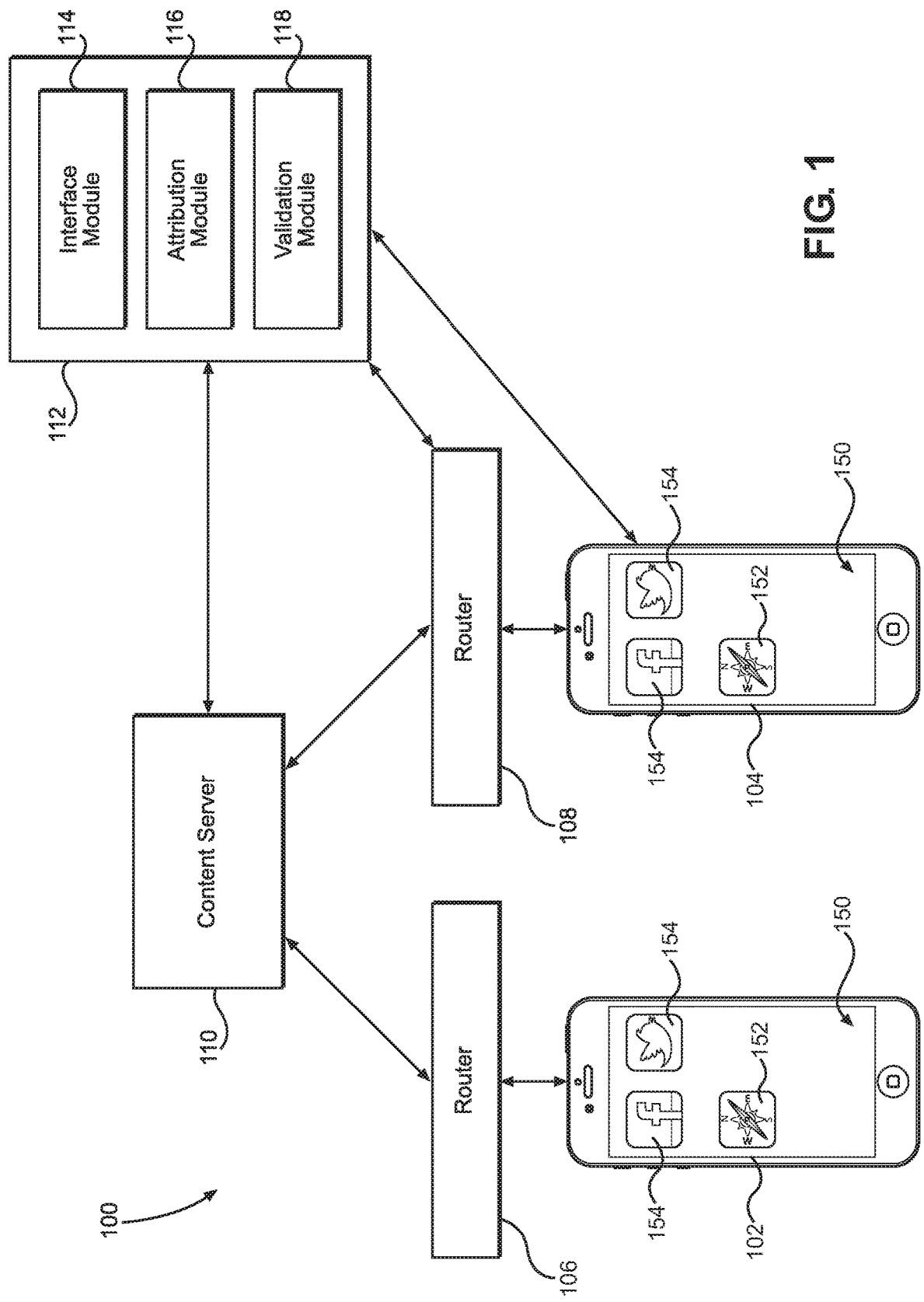
FIG. 1 illustrates an exemplary system of transmitting content to a device.

FIG. 1 illustrates an exemplary system 100 including hardware and network configurations for transmitting content to one or more devices 102, 104. As shown, the system 100 may also include one or more routers 106, 108, a content server 110, and an analysis server 112 in communication with one another.

The devices 102, 104 may embody one or more personal and/or household devices including but not limited to a desktop, a laptop computer, a mobile device, such as a smartphone or a tablet, a smart watch, smart glasses, a gaming console, an over-the-top content (OOT) device, a set top box, a router, a smart TV, a kiosk terminal, a Global Positioning System (GPS) device, and/or other devices. The devices 102, 104 may be loaded with an operating system 150 and one or more web browsers 152 configured to render webpages and/or other web or application content from the content server 110. Exemplary operating systems 150 include Microsoft Windows. Apple OS X. Linux, iOS, and Android, and exemplary web browsers 152 include Internet Explorer, Google Chrome, Mozilla Firefox, and Safari. The operating systems 150 may also provide access to one or more applications (apps) 154 configured to access and presents data to the user. Exemplary apps 154 include Facebook. Twitter, Instagram, and YouTube. The app 154 may further include an embedded browser that may be accessed, for example, when the user accesses a hyperlink in the app 154. The embedded browsers may therefore render webpages on the device 102, 104 through the app 154. The devices 102, 104 may have one or more identifiers based on access to content through the browsers 152 and/or apps 154, such as a cookie stored on the device 102, 104 and/or an assigned advertising identifier (e.g., Apple's Identifier for Advertisers (IDFA), Google's Advertising ID, and Microsoft's Advertising ID). The router 106, 108 and/or the content server 110 may generate the identifiers and place the browser's identifiers on hard drives of the devices 102, 104 detailing user history and information, as discussed below. The devices 102, 104 may clear, delete or reset the identifiers in a number of different manners. The identifiers may be generated as a session cookie, such that the device 102, 104 may automatically clear or reset the identifier after the browser is closed. The user may manually clear or delete the identifiers from the device 102, 104 by going into the settings of the device 102, 104. The device 102, 104 may further clear or delete the identifier when updating software, such as uploading a new version of the app. After the identifier is cleared or deleted, the content server 110 may not recognize the device 102, 104 when revisiting the website and/or app. Accordingly, the routers 106, 108 and/or the content server 110 may generate a new identifier when the device 102, 104 revisits the website and/or app.

Some devices (e.g., device 104) may be voluntarily subjected to monitoring software that may transmit panel data to the analysis server 112 indicating activity of the device 104. The panel data may provide ground truth for the processes of the system 100, as further discussed herein. The monitoring software may include one or more of OS level monitoring software installed on the device 104 and/or a virtual private network (VPN) accessed by the device 104. The monitoring software may be configured to transmit data packets from the device 104 to the analysis server 112 for further processing. The monitoring software may transmit data packets including, for example, unique hardware identifiers (e.g., Media Access Control (MAC) address) associated with the device 104, feature sets associated with the device 104 (e.g., operating system and/or browser configurations), timestamps associated with activity and/or transmittal, identifiers, and/or position data (e.g., an IP address). Some devices (e.g., device 102) may not be subject to monitoring software and the analysis server 112 may characterize the device 102 through the systems and methods discussed herein.

One or more of the devices 102, 104 may be in communication with the Internet via the routers 106, 108 connected to an Internet Service Provider (ISP). The devices 102, 104 may communicate with proxy servers and/or data servers (e.g., content server 110) over a network established by the routers 106, 108, such that the device 102, 104 may upload and download packets of data to and from the content server 110 via the router 106, 108. The device 102, 104 may be connected to the router 106, 108 over one or more communication channels (e.g., wired, wireless, or both). For example, the device 102, 104 may be connected to the router 106, 108 by an Ethernet cable and/or via WiFi. The router 106, 108 may be part of a household network, a public network, and/or an office network of varying size. The router 106, 108 may be assigned an Internet Protocol (IP) address, such as version 4 (IPv4) or version 6 (IPv6). The router 106, 108 may have a static or dynamic IP address. The IP address of the router 106, 108 may be assigned to the devices 102, 104 when connected to the router 106, 108.

As similarly discussed regarding the device 104, the router 108 may, additionally or alternatively, have monitoring software configured to transmit panel data of the device 104 to the analysis server 112. For example, the router 108 may record a unique hardware identifier (e.g., Media Access Control (MAC) address) of the devices 104 when connected to the router 108. The router 108 may track and record browsers 152, apps 154, and/or webpages accessed by the device 104 when connected to the router 108. The router 108 may track browser identifiers and/or advertising identifiers assigned to the device 104 when accessing the webpages. The router 108 may transmit the panel data in packets of data to the analysis server 112 for further processing. The router 108 may include any type of monitoring software, such as a packet monitor or deep packet inspection system, that is connected to a network link that collects packets from which the time, location, and identifier information (e.g., browser and/or advertising identifiers) are extracted.

The content server 110 may include website owners and/or content publishers configured to transmit content to and from the devices 102, 104, via the router 106, 108. The content server 110 may include search engines (e.g., Google), media streaming entities (e.g., Netflix), news providers (e.g., CNN), online retailers (e.g., Amazon), financial institutions (e.g., Bank of America), and/or email providers (e.g., Gmail). The content server 110 may be in communication with users of the devices 102, 104 through publication of the websites and/or apps.

The content server 110 may generate census data including server logs with records of requests for resources across the Internet. The logs may include requests from the device 102, 104, for example, to publishers of web pages, for advertisements, and/or for Internet resources from installed applications 154. The census data may include identifiers (e.g., a web cookie, a browser identifier, and/or an advertising identifier), an IP addresses, feature sets (e.g., user agent of the device and screen resolution), and/or time stamps. The census data may be provided to the analysis server 112 by the content providers directly and/or may be collected by the analysis server 112 through tags that are directly on web pages of the content servers 110. The analysis server 112 may extract feature sets from the identifiers from the census data, as discussed herein. However, census data in general may not include a unique hardware level identifier that would indicate the device associated with identifiers.

The content server 110 may transmit the census data to the analysis server 112 for additional processing.

The content server 110 may also attempt to place the identifier on the device 102, 104 based on access of the user to the websites and/or apps, or based on the browser's acceptance of the identifier. For example, the identifier may include a first-party cookie placed by the host domain and/or a third-party cookie placed by someone other than the host domain (e.g., a loaded image, a JavaScript, and/or an iframe). The content server 110 may generate the identifiers to record browser activity data, such as click data, login data, data of visited webpages, and/or data detailing items added into a shopping cart. The content server 110 may also generate the identifiers to record personal user information, such as form field entries, names, addresses, passwords, and credit cards. The identifiers may enable interaction of the websites and/or apps with repeat users, such as expediting checkout on a retailer webpage. The content server 110 may share the identifiers to other content servers 110 on a limited basis, or not share the identifiers to other content servers 110 at all. Therefore, the identifiers may be generally unique for each of the content servers 110. The content server 110 may then access the identifier from the device 102, 104, for example, when the device 102, 104 revisits the webpage and/or app to provide personalized content.

The analysis server 112 may include one or more processors, computer readable memories, such as hard drives, and/or servers in communication with the devices 102, 104, the routers 106, 108, and/or the content servers 110. The analysis server 112 may include one or more modules configured to perform the functions of the present disclosure. For example, the analysis server 112 may include an interface module 114, an attribution module 116, and an optional validation module 118. In some implementations, the interface module 114, the attribution module 116, and the optional validation module 118 may be included in the router 108. The modules are software saved on a storage device or incorporated into hardware of the analysis server 112.

The interface module 114 of the analysis server 112 may be configured to send and receive data to and from at least one of the devices 102, 104, the routers 106, 108, and/or the content server 110. The interface module 114 may be configured to receive panel data from the monitoring software installed on the device 104 and/or the router 108. For example, the interface module 114 may be configured to receive unique hardware identifiers, device identifiers, and/or features from monitoring software installed on the device 104 and/or the router 108. The interface module 114 may also be configured to receive census data from the content server 110, including additional identifiers for devices 102, 104, associated feature sets, location data (e.g., an IP address), and/or time stamps. The census data may not include any unique hardware identifiers.

The analysis server 112 may be configured to analyze the identifiers to determine features that may indicate that the identifiers were assigned to a common device. For example, the attribution module 116 may be configured to analyze the panel data and populate a panel database with identifiers and an indicator of whether identifiers are associated with a common device. The attribution module 116 may then apply a test (e.g., a Bayesian similarity algorithm) based on the panel database to determine whether features sets of unlabeled identifiers are directed to a common device (e.g., the device 102). In some embodiments, the attribution module 116 may first filter the unlabeled identifiers to pare down the number of potential pairs of feature sets. For example, the attribution module 116 may filter the unlabeled identifiers based on IP-colocations or visiting a common website. The analysis server 112 may also be configured to validate the test to determine accuracy. For example, the validation module 118 may be configured to validate the test using leave-one-out cross validation. The leave-one-out cross validation may include partitioning a known true dataset into training and test sets.

Although not shown in FIG. 1, each of the devices 102, 104, the routers 106, 108, the content server 110, and the analysis server 112 may include one or more processors configured to perform the various functions of the disclosure. The processor(s) may have varying core configurations and clock frequencies. These entities may also include one or more memory devices or computer-readable media of varying physical dimensions and storage capacities (e.g., flash drives, hard drives, random access memory, etc.) for storing data, such as images, files, and program instructions for execution by one or more processors. These entities may include one or more network interfaces, such as Ethernet adapters, wireless transceivers, or serial network components for communicating over wired or wireless media using protocols, such as Ethernet, wireless Ethernet, code divisional multiple access (CDMA), time division multiple access (TDMA), etc. These communication protocols may be used to communicate between the devices 102, 104, the routers 106, 108, the content server 110, and the analysis server 112. These entities may also have one or more peripheral interfaces, such as keyboards, mice, touchpads, displays, computer screens, touchscreens, etc. for enabling human interaction with and manipulation of the devices 102, 104, the routers 106, 108, the content server 110, and the analysis server 112.

Figure 2:
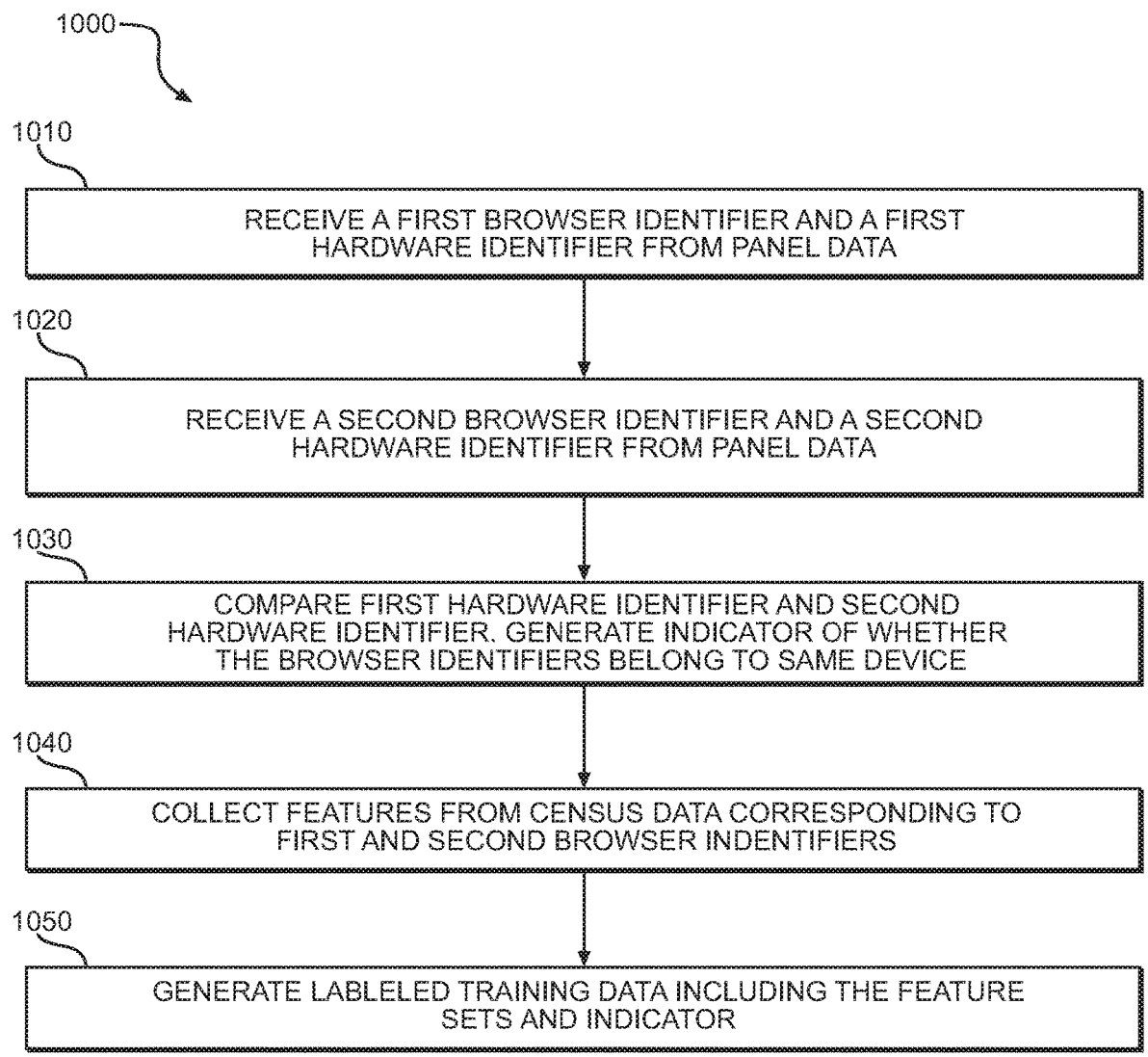
FIG. 2 illustrates a first exemplary method of generating a panel database for the system of FIG. 1.

FIG. 2 illustrates an exemplary method 1000 for generating a panel database for the system 100. Even though discussed as being primarily performed by the analysis server 112, one or more steps of the method 1000 may be performed, in conjunction or alternatively, by the devices 102, 104, the routers 106, 108, and/or the content server 110.

In step 1010, the analysis server 112 may receive a first panel identifier and a first unique hardware identifier from panel data. In step 1020, the analysis server 112 may receive a second panel identifier and a second unique hardware identifier from panel data. The data of steps 1010, 1020 may be panel data received from monitoring software installed on the device 104 and/or the router 108, and/or may be received directly from the content server 110. The first and second panel identifiers may be in any number of forms including advertising identifiers and web cookies, as discussed above. For example, the first panel identifier may be a web browser cookie generated from Internet access through the browser 152, and the second panel identifier may be a web browser cookie generated from Internet access through the app 154. Alternatively, the first panel identifier may be a web browser cookie generated from Internet access through a first browser 152, and the second panel identifier may be a web browser cookie generated from Internet access through a second browser 152.

In step 1030, the analysis server 112 may compare the first unique hardware identifier and the second unique identifier to determine if the first and second panel identifiers are associated with a common device. The unique hardware identifiers (e.g., Media Access Control (MAC) address) for each of the panel identifiers may provide ground truth of whether the first and second panel identifiers are associated a common device.

In step 1040, the analysis server 112 may collect feature sets from census data corresponding to the first and second panel identifiers. The features sets may be considered labeled because of the association with the first and second panel identifiers. The first and second labeled feature set may provide processing and/or physical features of the device 104. For example, the first and second labeled feature sets may include one or more of a screen size of the device 104, a screen resolution of the device 104, a user agent string of the device 104, derivatives of the user agent string of the device 104, a manufacturer of the device 104, a model of the device 104, a version of the operating system 150 of the device 104, and memory capacity of the device 104.

In step 1050, the analysis server 112 may generate labeled training data with the first and second labeled feature sets and an indicator of whether the first and second labeled feature sets are associated with a common device. For example, the analysis server 112 may generate the labeled training data with first and second labeled feature sets determined to be associated with identifiers of a common device. The analysis server 112 may also generate the labeled training data with third and fourth labeled feature sets determined to be associated with identifiers of different devices. The analysis server 112 may repeat steps 1010-1050 to generate the labeled training data with any number of pairs of labeled feature sets and indicators of whether the pairs of labeled feature sets are associated with a common device or different devices.

Figure 3:
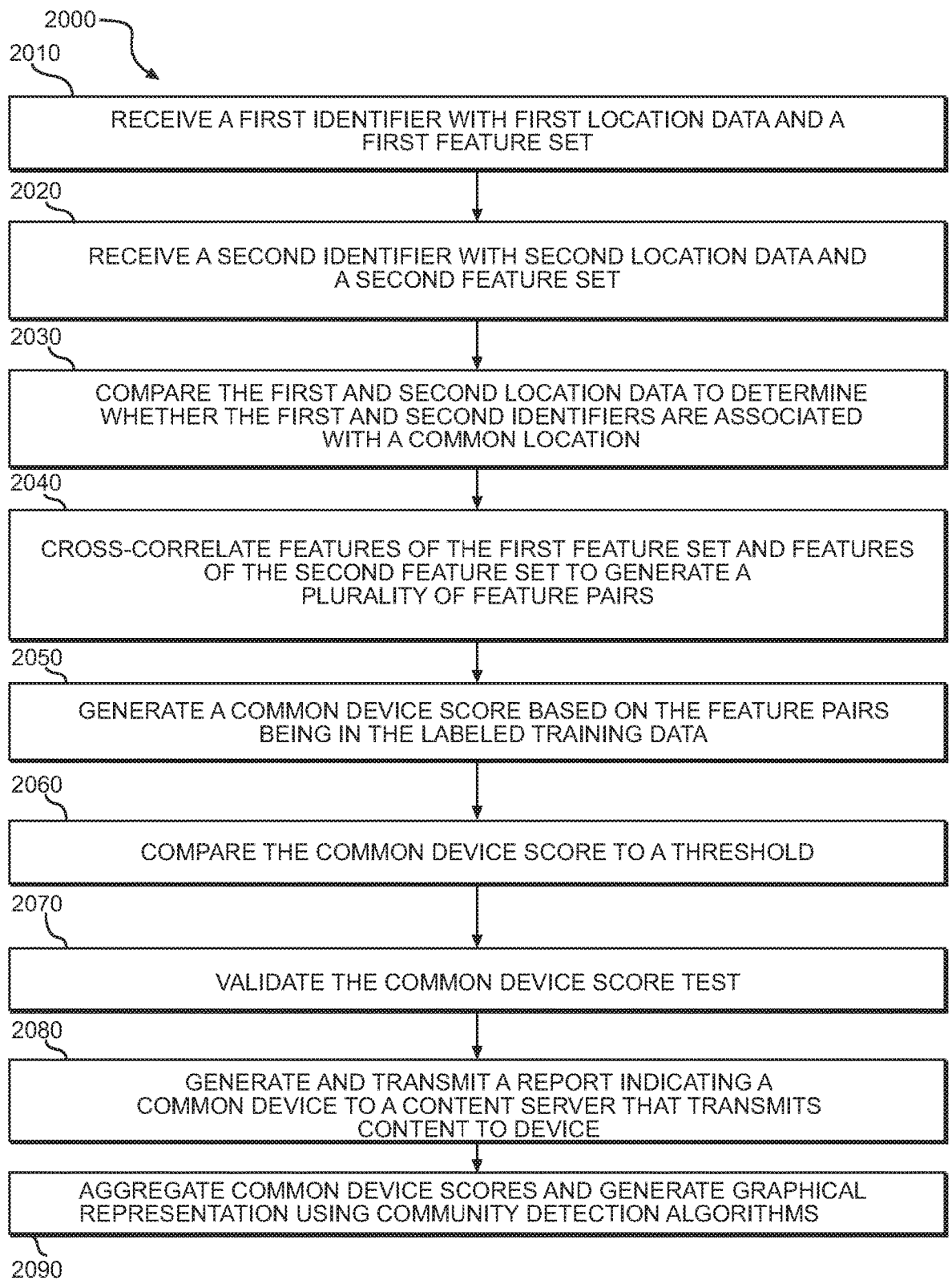
FIG. 3 illustrates a second exemplary method for generating a report and transmitting content to the device of FIG. 1.

FIG. 3 illustrates an exemplary method 2000 for generating and transmitting content to the device 102 based a plurality of identifiers associated with the device 102. Even though discussed as being primarily performed by the analysis server 112, one or more steps of the method 2000 may be performed, in conjunction or alternatively, by the devices 102, 104, the router 108, and/or the content server 110.

In step 2010, the analysis server 112 may receive a first identifier with first position data and a first feature set. In step 2020, the analysis server 112 may receive a second browser identifier with second position data and a second feature set. The identifiers and feature sets may be unlabeled because they are not known to be associated with a known device. The analysis server 112 may also receive a timestamp associated with each of the first identifier and the second identifier. The data received in steps 2010, 2020 may be census data from the content servers 110. The analysis server 112 may also receive labeled training data including labeled feature sets and indicators of whether the labeled feature sets are associated with a common device.

The first identifier may be a web browser cookie generated from Internet access through the browser 152, and the second identifier may be a web browser cookie generated from Internet access through the app 154. Alternatively, the first identifier may be a web browser cookie generated from Internet access through a first browser 152, and the second identifier may be a web browser cookie generated from Internet access through a second browser 152. The first and second identifiers may be received through a number of different mechanisms. For example, the first and second identifiers may be received through digital tagging of websites, videos, mobile apps, advertisements, web widgets and/or distributed content. The tagging may be implemented through JavaScript/HTML and/or SDK tag implementations. The device 102 may execute code locally and report information directly to a data warehouse in the form of a record. The data may also be received directed from the content server 110. As discussed above, the first and second feature sets may include one or more of a screen size of the device 104, a screen resolution of the device 104, a user agent string of the device 104, derivatives of the user agent string of the device 104, a manufacturer of the device 104, a model of the device 104, a version of the operating system 150 of the device 104, and memory capacity of the device 104. The first and second feature sets may be received through a number of different mechanisms, such as a JavaScript/HTML tag and/or a SKD tag. For example, a user-agent string may be included in a client HTTP call and indicate the type and version of the client web browser and operating system. The user agent string may be available with telemetry associated with web page tags. From an SDK tag, the model of the device 104 may use a traditional user tag (e.g., "iPhone 6s—32 GB"). The screen size of the device 104 may be collected by the JavaScript tag and/or the SDK tag and include with a record when available. An exemplary feature set may contain multiple distinct user agents and/or screen sizes, such as a feature set of {'Mozilla/5.0 . . . '; 'Mozilla/5.0 . . . '; 1080×1920; 540×960}.

In step 2030, the analysis server 112 may compare the first and second location data to determine that the first and second identifiers are associated with a common location. For example, the analysis server 112 may compare an IP address of the first identifier and an IP address of the second identifier to determine IP-colocation. The analysis server 112 may determine that the first identifier and the second identifier are associated with a common router 106. In some embodiments, the analysis server 112 may also further define the inquiry on the timestamp to determine whether the first identifier and the second identifier are associated with the common router 106 at a common time point or within a common time window. If the analysis server 112 determines that the first and second identifier are not associated with a common location, the analysis server 112 may determine that the first and second identifiers are not associated with a common device and may return to step 2010 to receive a different pair of identifiers. Step 2030 may reduce the space of potential browser ID pairs, and thus enable the systems and processes to be applied at scale. In some embodiments, the analysis server 112 may, additionally or alternatively, reduce the potential browser ID pairs in other way. For example, the analysis network 112 may filter the first and second identifiers based on the visiting a particular website.

In step 2040, the analysis server 112 may cross-correlate features of the first feature set and the second feature set to generate a plurality of feature pairs. For example, pairs may be generated by cross-correlating each of the features of the first feature set matching with each of the features of the second feature set. Therefore, M number of features of the first feature set and N number of features of the second feature set may generate M×N number of pairs of features. Cross-correlating each of the features of the first and second feature sets may provide more comprehensive data in determining the common device score.

In step 2050, the analysis server 112 may generate a common device score for the first and second feature sets based on pairs of the feature sets being present in the panel database. The analysis server 112 may attempt to match each of the pairs of the step 2040 with pairs of the labeled training data. For example, the analysis server 112 may determine that a first feature of the first feature set matches a first labeled feature of a labeled feature set of the labeled training data, and determine that a second feature of the second feature set matches a second labeled feature of the labeled feature set of the labeled training data. The analysis server 112 may then determine whether the first labeled feature and the second labeled feature of the entry are associated with a common device based on the corresponding indicator of the labeled training data. If the first and second labeled features are associated with a common device, then it would indicate that the first and second feature sets are associated with a common device. However, if the first and second labeled features are associated with different devices, then it would indicate that the first and second feature sets are associated with different devices. The common device score may aggregate the indicators (e.g., same or different devices) of each pair of labeled features sets that match each unlabeled feature pair of the feature sets to generate a common device score.

For example, in some embodiments, the analysis server 112 may utilize a pair-wise Bayesian approach. The common device score $L(X, X')$ of the feature sets X, r may be generated based on Equation (1), as indicated below. A first identifiers i may have a first feature set X where X is populated with features $\{x_1, x_2 \ldots\}$, and a second identifier i' may have a second feature set X' where X' is populated with features $\{x'_1, x'_2, \ldots\}$. $Y_{i,i'}$ may be a binary indicator of the pair of features matching in the panel database, such that $Y_{i,i'}=1$ indicates an entry in the labeled training data has matching pairs of labeled features, and the labeled features of the entry is known to be associated with a common device. $Y_{i,i'}=0$ indicates an entry in the labeled training data has matching pairs of labeled features, and the labeled features of the entry is associated with different devices. $P(X, X'|Y_{i,i'}=1)$ represents the sum of pairs of features that correspond to a common device in the panel database, and $P(X, X'|Y_{i,i'}=0)$ represents the sum of pairs of features that correspond to different devices in the panel database. In other words, the total common device score of the feature sets may be generated by the aggregate of the common device score of all pairs of features of the feature sets.

$$L(X, X') = \log \frac{P(X, X' | Y_{i,i'} = 1)}{P(X, X' | Y_{i,i'} = 0)} \quad (1)$$

In some embodiments, the analysis server 112 may, additionally or alternatively, determine the largest log likelihood in absolute value, as indicated in Equation (2). max* may indicate the term furthest in absolute value from zero. The determination may score only the most informative pairs of features from the pairs of feature sets.

$$S_{max}(i, i') = \max_{\ell,m}{}^* \log \frac{P(x_\ell, x'_m | Y = 1)}{P(x_\ell, x'_m | Y = 0)} \quad (2)$$

In step 2060, the analysis server 112 may compare the common device score to a threshold to determine if the first and second feature sets are associated with a common device. The threshold may be generated based on a negative correlation of the number of features of the first and second feature sets. For example, the analysis server 112 may generate a lower threshold for larger feature sets considered. If the common device score exceeds the threshold, the analysis server 112 may determine the identifiers are associated with a common device. However, if the common device score is less than the threshold, the analysis server 112 may determine that the identifiers are not associated with different device.

In step 2070, the analysis server 112 may validate the common device score test. For example, the analysis server 112 may validate the test using leave-one-out cross validation. The leave-one-out cross validation may include partitioning a known true dataset into training and test sets.

In step 2080, the analysis server 112 may generate and transmit a report to the content server 110. The report may indicate that the first and second identifiers are associated with a common device. The content server 110 may generate and transmit more comprehensive content to the device 102 based on the first and second identifiers. For example, the content server 110 may base advertisement content on a large number of identifiers, including the identifiers that have been reset by the device 102.

In step 2090, the analysis server 112 may aggregate the common device scores and generate a graphical representation using community detection algorithms. For example, the analysis server 112 may graphically cluster the identifiers into small groups that correspond to individual devices using community detection algorithms, such as a modified Louvain Modularity community detection algorithm. The scored pairs of identifiers comprise a weighted graph, with nodes defined by identifiers. The modified Louvain Modularity groups nodes by optimizing graph modularity, a measure of the strength of the community structure.

The modified Louvain Modularity can accommodate positive and negative scores of the common device score (e.g., positive indicates the same device and negative indicates different devices). The Louvain Modularity treats the positive and negative scores as separate graphs, the positive graph attracts while the negative graph repels.

By adding a universal constant to the scores, the size of the output groupings may be controlled. In an extreme case, when a large negative value is added, all common device scores may become negative and repulsive, and each identifier is grouped only with itself. Adding a large positive value forces all connected identifiers to be grouped together.

The analysis server 112 may further graphically cluster the identifiers to indicate that the devices are associated with common households. The graphical representation may be generated on a display of the content server 110 and/or the analysis server 112. The graphical representation may be useful in measurement reporting, auditing, fraud detection, and/or targeting advertisement.

Steps 2010-2090 may be repeated for any number of identifiers to characterize the relationship of the identifiers to physical devices.

One or more of software modules incorporating the methods described above can be integrated into a computer system or non-transitory computer-readable media. Moreover, while illustrative embodiments have been described herein, the scope includes any and all embodiments having equivalent elements, modifications, omissions, combinations (e.g., of aspects across various embodiments), adaptations or alterations based on the present disclosure. Further, the steps of the disclosed methods can be modified in any manner, including by reordering steps or inserting or deleting steps.

What is claimed is:

1. A computerized method comprising:
   receiving training data including labeled feature sets and an indicator of a common device;
   receiving a first identifier with a first unlabeled feature set that does not have a known association with a known device;
   receiving a second identifier with a second unlabeled feature set that does not have a known association with a known device;
   combining the first unlabeled feature set and the second unlabeled feature set to generate a plurality of feature pairs;
   generating a common device score based on feature pairs matching one or more pairs of the labeled feature sets of the training data;
   comparing the common device score to a threshold;
   associating, in response to the comparison of the common device score to the threshold, the first identifier and the second identifier with a single device;
   generating a report that indicates that the first identifier and the second identifier are associated with the single device; and
   generating, on a display, a graphical representation that clusters the first identifier and the second identifier,
   wherein the first unlabeled feature set and the second unlabeled feature set include at least one of a screen size, a screen resolution, a user agent string, a manufacturer, a model, an operating system version, or a memory capacity.

2. The computerized method of claim 1, further comprising transmitting the report to a content server that transmits content to the single device.

3. The computerized method of claim 1, the method further comprising:
receiving a first panel identifier with a first unique hardware identifier;
receiving a second panel identifier with a second unique hardware identifier;
comparing the first unique hardware identifier and the second unique hardware identifier to determine whether the first panel identifier and the second panel identifier are associated with a common device;
generating the indicator of a common device;
collecting first labeled features associated with the first panel identifier from census data;
collecting second labeled features associated with the second panel identifier from census data; and
populating the training data with the first and second labeled features to generate the labeled feature sets and the indicator of a common device.

4. The computerized method of claim 3, further comprising:
receiving a third panel identifier with a third unique hardware identifier;
receiving a fourth panel identifier with a fourth unique hardware identifier;
comparing the third unique hardware identifier and the fourth unique hardware identifier to determine that the third panel identifier and the fourth panel identifier are associated with different devices;
generating an indicator of different devices;
collecting third labeled features associated with the third panel identifier from census data;
collecting fourth labeled features associated with the fourth panel identifier from census data; and
populating the training data with the third and fourth labeled features to generate the labeled feature sets and the indicator of different devices.

5. The computerized method of claim 3, wherein generating the common device score includes:
determining that a first unlabeled feature of the first unlabeled feature set matches a first labeled feature of the labeled feature sets;
determining that a second unlabeled feature of the second unlabeled feature set matches a second labeled feature of the labeled feature sets;
accessing the indicator of a common device; and
aggregating the indicator with additional indicators to generate the common device score.

6. The computerized method of claim 3, wherein:
combining the first unlabeled feature set and the second unlabeled feature set includes cross-correlating a plurality of features of the first unlabeled feature set and a plurality of features of the second unlabeled feature set to generate the plurality of feature pairs; and
generating the common device score includes aggregating the matched feature pairs to generate the common device score.

7. The computerized method of claim 3, wherein generating the common device score is based on a pair-wise Bayesian approach.

8. The computerized method of claim 1, wherein the first identifier is associated with a first internet browser, and the second identifier is associated with a second internet browser.

9. The computerized method of claim 1, further comprising:
receiving first location data with the first identifier;
receiving second location data with the second identifier; and
comparing the first location data and the second location data to determine that the first identifier and the second identifier are associated with a common location,
wherein generating the common device score is based on the common location.

10. The computerized method of claim 1, wherein the graphical representation indicates the common device score of the first identifier and the second identifier.

11. A system, comprising:
at least one processor; and
at least one memory storing instructions that, when executed, cause the at least one processor to perform a method, the method comprising:
receiving training data including labeled feature sets and an indicator of a common device;
receiving a first identifier with a first unlabeled feature set that does not have a known association with a known device;
receiving a second identifier with a second unlabeled feature set that does not have a known association with a known device;
combining the first unlabeled feature set and the second unlabeled feature set to generate a plurality of feature pairs;
generating a common device score based on feature pairs matching one or more pairs of the labeled feature sets of the training data;
comparing the common device score to a threshold;
associating, in response to the comparison of the common device score to the threshold, the first identifier and the second identifier with a single device;
generating a report that indicates that the first identifier and the second identifier are associated with the single device; and
generating, on a display of a device, a graphical representation that clusters the first identifier and the second identifier,
wherein the first unlabeled feature set and the second unlabeled feature set include at least one of a screen size, a screen resolution, a user agent string, a manufacturer, a model, an operating system version, or a memory capacity.

12. The system of claim 11, wherein the method further comprises transmitting the report to a content server that transmits content to the single device.

13. The system of claim 11, wherein the method further comprises:
receiving a first panel identifier with a first unique hardware identifier;
receiving a second panel identifier with a second unique hardware identifier;
comparing the first unique hardware identifier and the second unique hardware identifier to determine whether the first panel identifier and the second panel identifier are associated with a common device;
generating the indicator of a common device;
collecting first labeled features associated with the first panel identifier from census data;
collecting second labeled features associated with the second panel identifier from census data; and populating the training data with the first and second labeled features to generate the labeled feature sets and the indicator of a common device.

14. The system of claim 13, wherein the method further comprises:
receiving a third panel identifier with a third unique hardware identifier;
receiving a fourth panel identifier with a fourth unique hardware identifier;
comparing the third unique hardware identifier and the fourth unique hardware identifier to determine that the third panel identifier and the fourth panel identifier are associated with different devices;
generating an indicator of different devices;
collecting third labeled features associated with the third panel identifier from census data;
collecting fourth labeled features associated with the fourth panel identifier from census data; and
populating the training data with the third and fourth labeled features to generate the labeled feature sets and the indicator of different devices.

15. The system of claim 13, wherein generating the common device score includes:
determining that a first unlabeled feature of the first unlabeled feature set matches a first labeled feature of the labeled feature sets;
determining that a second unlabeled feature of the second unlabeled feature set matches a second labeled feature of the labeled feature sets;
accessing the indicator of a common device; and
aggregating the indicator with additional indicators to generate the common device score.

16. A non-transitory computer-readable medium storing instructions which, when executed, cause one or more processors to perform a method, the method comprising:
receiving training data including labeled feature sets and an indicator of a common device;
receiving a first identifier with a first unlabeled feature set that does not have a known association with a known device;
receiving a second identifier with a second unlabeled feature set that does not have a known association with a known device;
combining the first unlabeled feature set and the second unlabeled feature set to generate a plurality of feature pairs;
generating a common device score based on feature pairs matching one or more pairs of the labeled feature sets of the training data;
comparing the common device score to a threshold;
associating, in response to the comparison of the common device score to the threshold, the first identifier and the second identifier with a single device; and
generating a report that indicates that the first identifier and the second identifier are associated with the single device; and
generating, on a display of a device, a graphical representation that clusters the first identifier and the second identifier,
wherein the first unlabeled feature set and the second unlabeled feature set include at least one of a screen size, a screen resolution, a user agent string, a manufacturer, a model, an operating system version, or a memory capacity.

17. The non-transitory computer-readable medium of claim 16, wherein the method further comprises transmitting the report to a content server that transmits content to the single device.

18. The non-transitory computer-readable medium of claim 16, wherein the method further comprises:
receiving a first panel identifier with a first unique hardware identifier;
receiving a second panel identifier with a second unique hardware identifier;
comparing the first unique hardware identifier and the second unique hardware identifier to determine whether the first panel identifier and the second panel identifier are associated with a common device;
generating the indicator of a common device;
collecting first labeled features associated with the first panel identifier from census data;
collecting second labeled features associated with the second panel identifier from census data; and
populating the training data with the first and second labeled features to generate the labeled feature sets and the indicator of a common device.

19. The non-transitory computer-readable medium of claim 18, wherein the method further comprises:
receiving a third panel identifier with a third unique hardware identifier;
receiving a fourth panel identifier with a fourth unique hardware identifier;
comparing the third unique hardware identifier and the fourth unique hardware identifier to determine that the third panel identifier and the fourth panel identifier are associated with different devices;
generating an indicator of different devices;
collecting third labeled features associated with the third panel identifier from census data;
collecting fourth labeled features associated with the fourth panel identifier from census data; and
populating the training data with the third and fourth labeled features to generate the labeled feature sets and the indicator of different devices.

* * * * *